May 9, 1950 P. E. HURTHIG 2,506,834
ANIMAL TRAP
Filed May 28, 1946 2 Sheets-Sheet 1
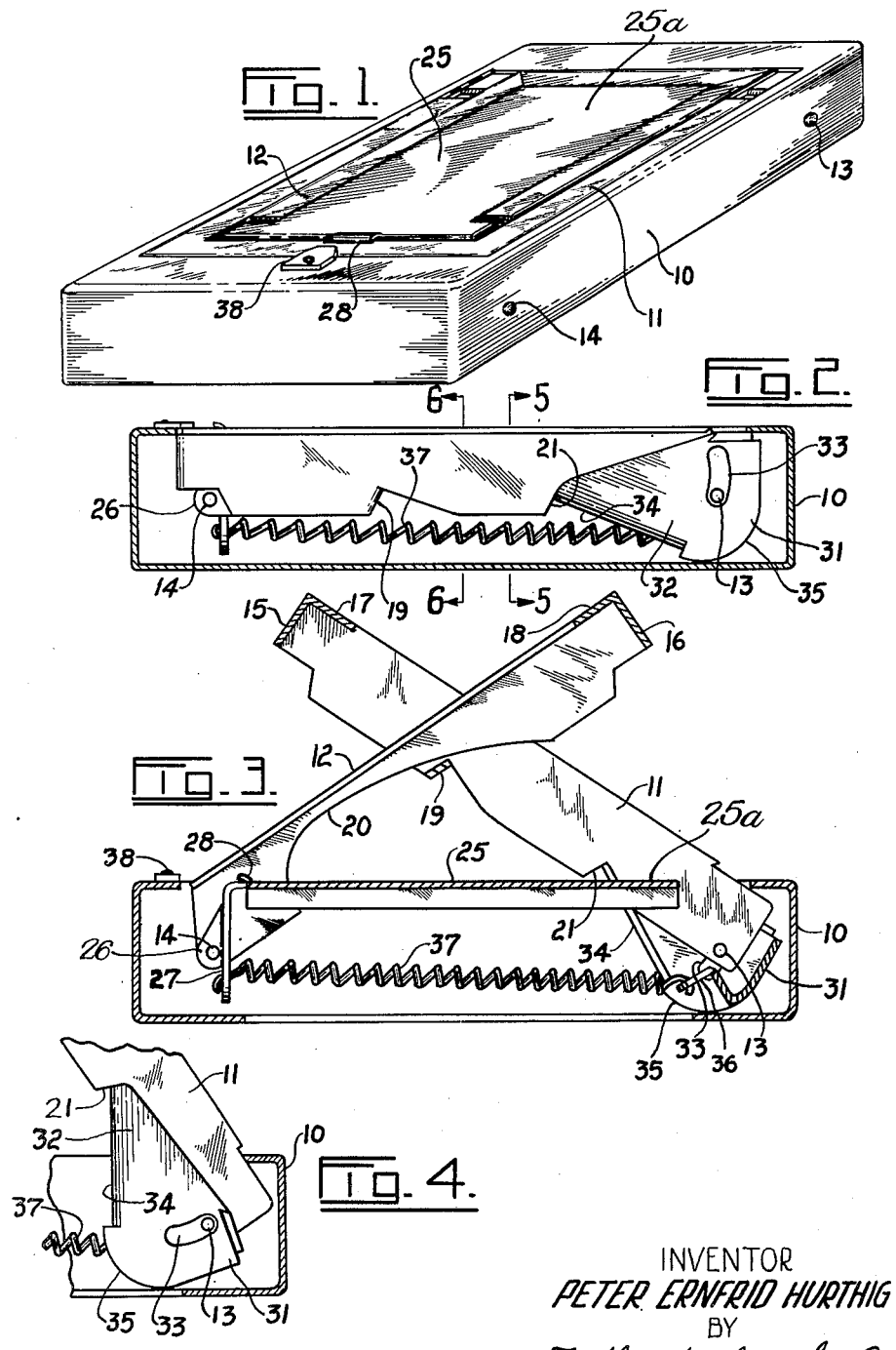
INVENTOR
PETER ERNFRID HURTHIG
BY
Fetherstonhaugh & Co.
ATTORNEYS

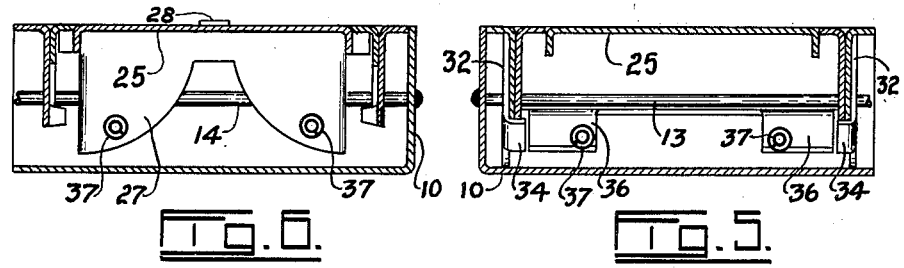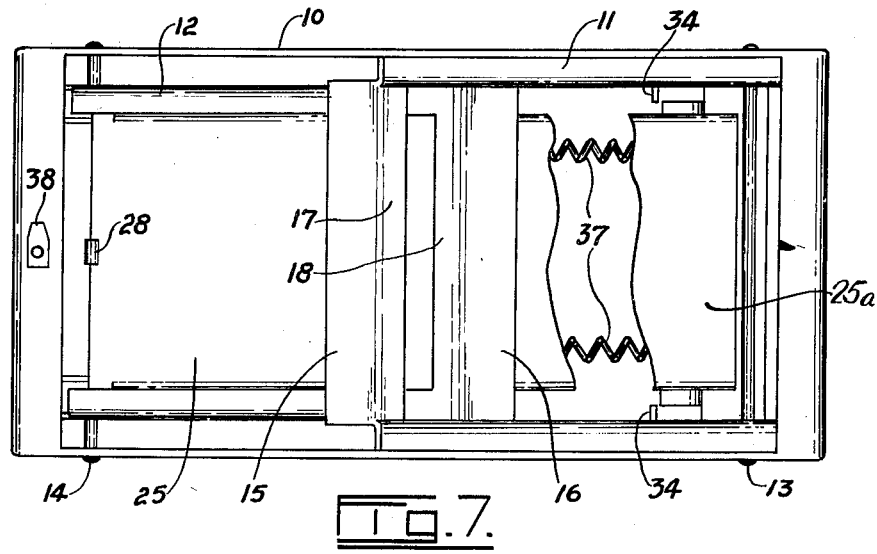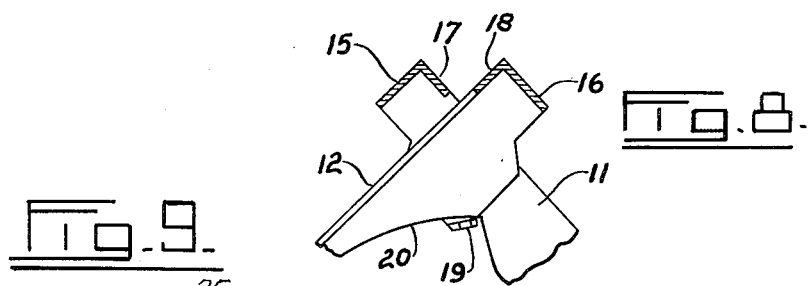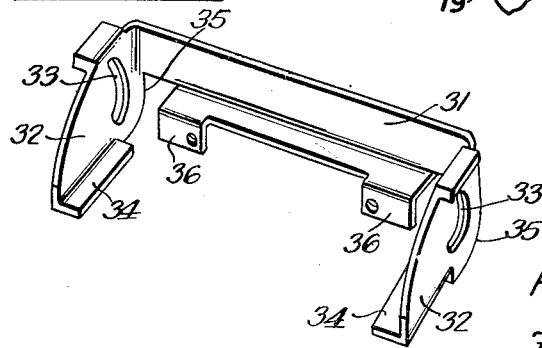

Patented May 9, 1950

2,506,834

UNITED STATES PATENT OFFICE 2,506,834

ANIMAL TRAP

Peter Ernfrid Hurthig, Vancouver, British Columbia, Canada

Application May 28, 1946, Serial No. 672,838

9 Claims. (Cl. 43—93)

1

This invention relates to traps for firmly gripping and retaining animals.

The object of this invention is the provision of an animal trap, the working parts of which do not come into contact with the earth when it is buried in the ground, which is not affected by frost, which operates much faster than the usual traps of this type, and which grips the animals so firmly they cannot get free.

With these and other objects in view, the present invention consists essentially of an animal trap comprising a frame, a jaw pivotally mounted at each end of the frame and extending towards the opposite end, one jaw fitting inside the other, means for releasably retaining the jaws in horizontal position, spring means for urging the jaws upwardly when they are released, the ends of said jaws when in this position combining to form a gripping element, and means for removably locking the jaws in their uppermost position, as more fully described in the following specification and illustrated in the accompanying drawings, in which:

Figure 1 is a perspective view of the trap in its set position,

Figure 2 is a side elevation of the trap with the near side removed,

Figure 3 is a longitudinal sectional view with jaws almost in their gripping position, Figure 4 is a fragmentary side elevation of the lower or pivot end of one of the jaws, Figure 5 is a cross section taken on the line 5—5 of Figure 2, Figure 6 is a cross section taken on the line 6—6 of Figure 2, Figure 7 is a plan view of the trap after it has been sprung, Figure 8 is a section through the free ends of the jaws in gripping position, and Figure 9 is a perspective view of a locking member for the trap.

Referring more particularly to the drawings, 10 is a rectangular frame which is open at its top and bottom and having jaws 11 and 12 at its opposite ends. The jaws 11 and 12 are mounted on pivot pins 13 and 14, respectively, which extend transversely of the frame, said jaws extending from one end of the frame towards the other. The jaws are substantially U-shaped with their outer or free ends formed with the respective cross members 15 and 16 and with flanges 17 and 18. Jaw 12 fits inside the jaw 11 between lugs 19 formed on the latter and the free end thereof. The lugs 19 ride on the irregularly curved bearing surfaces 20 formed in the sides of the

2 jaw 12. Shoulders 21 are formed on the sides of the jaw 11 spaced from the pivot end thereof.

A horizontal platform 25 lies between the jaws and has arms 26 extending downwardly from the opposite sides of one end thereof, said arms being pivotally mounted on the pin 14, see Figure 3. A flange 27 depends from this end of the platform. A lug 28 is formed on the pivot end of the platform and is adapted to overlap the flange 17 of jaw 11 when the jaws are in their horizontal positions.

A locking device is provided for the jaw 11 at the pivot end thereof. This device consists of a U-shaped locking member 31 having side arms 32 extending along the sides of this jaw, and each arm has an arcuate slot 33 therein through which the pivot pin 13 extends, and is formed with an inwardly extending flange 34 which is adapted to engage one of the shoulders 21. The lower corners of the arms 32 are rounded as at 35 and ride on the bottom of the frame 10. One or more lugs 36, see Figures 3, 5 and 9, are formed on the member 31 below the pin 13 and are connected by one or more tension springs 37 to the flange 27 pivoting on the pin 14.

A locking piece 38, see Figure 1, is pivoted on one end of the frame and may be turned to overlap the end of the jaw 11 to lock the jaws in this position.

When the locking piece 38 is turned to release the jaw 11, the trap is set and ready for use. The lug 28 of the platform normally retains the jaws 11 and 12 in the open or horizontal position, as shown in Figure 1, and the springs 37 hold the platform in its horizontal position. When the free end 25a of the platform is depressed by the foot of an animal, its lug is withdrawn from the end of the jaw 11, thus releasing it. At this time, the springs pivot the member 31 about the pin 13 causing the flanges 34 to bear against the sides of the jaw 11 forcing its free end upwardly until said flanges engage the shoulders 21, see Figure 4, at which time the jaw is locked in its uppermost position. The springs move the member 31 on its curved surfaces 35 until the pin 13 is positioned at the upper or outer end of the slots 33. As the jaw 11 moves upwardly, the lugs 19 ride along the bearing surfaces 20 of the jaw 12, raising the free end of the latter upwardly, said jaw pivoting on the pin 14.

When the jaws are in their uppermost position, the flanges 17 and 18 slope downwardly towards each other and they grip the leg of the animal therebetween. These flanges are substantially at right angles to each other and when the animal struggles to pull its leg out, it merely draws the flanges closer together to tighten the grip.

As long as the locking member 31 remains in the position shown in Figure 4, the jaws cannot be moved downwardly. In order to reset the trap, it is only necessary to slide the member 31 along the bottom of the frame on the curved surfaces 35 until the pin 13 abuts against the opposite end of the slot 33, at which time the arms 32 disengaged the shoulders 21, thus permitting the jaws to be moved back into their horizontal position with the lug 28 of the platform overlapping the end of jaw 11. The trap is set at safety by turning the locking piece 38 to overlap the end of said jaw.

This trap may be buried and the working parts, which are all within the frame, do not come into contact with the earth. With this flat construction, only a very thin layer of earth need be placed over the top of the trap, with the result that freezing of the moisture in the earth will not prevent the device from operating. In most traps, the jaws move to a position about 90° to the horizontal, whereas the jaws of this trap only move to approximately 45° so that it operates in half the time of the others. As stated above, the opposed sloping flanges 17 and 18 cause the jaws to grip harder as the animal struggles to get away.

What I claim as my invention is:

1. An animal trap comprising a frame, a jaw pivotally mounted at each end of the frame and extending towards the opposite end, one jaw fitting inside the other, means for releasably retaining the jaws in horizontal position, spring means for urging the jaws upwardly when they are released, the ends of said jaws when in this position combining to form a gripping element, and a locking member carried by the frame for removably locking the jaws in their uppermost position.

2. An animal trap comprising a frame, a jaw pivotally mounted at each end of the frame and extending towards the opposite end, one jaw fitting inside the other, a platform pivotally mounted at one end between the jaws and having a lug at its pivot end overlapping one of the jaws to hold them in horizontal position, said lug releasing the jaws when the free end of the platform is depressed, spring means at the pivot end of one of the jaws normally urging the free end of the latter upwardly, means on said jaw for drawing the other jaw upwardly with it and retaining it there, the outer ends of said jaws when in this position combining to form a gripping element, and a locking member mounted adjacent the spring-controlled jaw for removably locking it in its uppermost position.

3. A device according to claim 1 in which each jaw has a flange at its outer end which slopes downwardly toward the corresponding flange of the other jaw when said jaws are in their uppermost positions.

4. An animal trap comprising a frame, a jaw pivotally mounted at each end of the frame and extending towards the opposite end, one jaw fitting inside the other, a horizontal platform pivotally mounted at one end on the pivot of one of the jaws, spring means connected to the opposite jaw below the pivot thereof and to the platform below its pivot, said spring means urging the jaws upwardly when they are released and the ends of said jaws when in this position combining to form a gripping element, and means for removably locking the jaws in their uppermost position.

5. A device according to claim 1 in which the locking member consists of a U-shaped member having arcuate slots formed in its side arms through which the pivot of one of the jaws extends, said arms being adapted to engage shoulders on the jaw when the latter is in its uppermost position.

6. An animal trap comprising a frame, a jaw pivotally mounted at each end of the frame and extending towards the opposite end, one jaw fitting inside the other, a horizontal platform pivotally mounted at one end on the pivot of one of the jaws, a U-shaped locking member having arcuate slots formed in its side arms through which the pivot of the other jaw extends, shoulders formed on the jaw near the locking member, and spring means connected to the locking member below the pivot thereof and to the platform below its pivot, said spring means normally urging the jaws upwardly with the locking member arms engaging the shoulders of one of the jaws and the ends of said jaws when in this position combining to form a gripping element.

7. An animal trap comprising a frame, a jaw pivotally mounted at each end of the frame and extending towards the opposite end, one jaw fitting inside the other, a horizontal platform pivotally mounted on the frame adjacent one end thereof, said platform extending towards the opposite end of the frame, a U-shaped locking member pivotally mounted in the frame at the end thereof opposite the platform mounting, said member having side arms bearing against one of the jaws, shoulders formed on said jaw near the locking member, and spring means connected to the platform and to the member near the pivots thereof, said spring means normally urging the free end of the platform and the member arms upwardly, and said arms raising the jaw and engaging the shoulder thereof when it is raised to lock it in this position.

8. An animal trap comprising a frame, a jaw pivotally mounted at each end of the frame and extending towards the opposite end, one jaw fitting inside the other, a platform pivotally mounted at one end between the jaws and having a lug at its pivot end overlapping one of the jaws to hold them in horizontal position, said lug releasing the jaws when the free end of the platform is depressed, a U-shaped locking member pivotally mounted in the frame adjacent the pivot of one of the jaws, said member having side arms bearing against this jaw, spring means connected to the member normally urging the arms thereof and the jaw in engagement therewith upwardly, and means on said jaw for drawing the other jaw upwardly with it and retaining it there, the outer ends of said jaws when in this position combining to form a gripping element.

9. An animal trap comprising a frame, a jaw pivotally mounted at each end of the frame and extending towards the opposite end, one jaw fitting inside the other, a platform pivotally mounted at one end between the jaws and having a lug at its pivot end overlapping one of the jaws to hold them in horizontal position, said lug releasing the jaws when the free end of the platform is depressed, a U-shaped locking member pivotally mounted in the frame adjacent the pivot of one of the jaws, said member having side arms bearing against this jaw, spring means connected to the member normally urging the arms thereof and the jaw in engagement therewith upwardly, means on said jaw for drawing the other jaw upwardly with it and retaining it there, the outer ends of said jaws when in this position combining to form a gripping element, and shoulders on the jaw which is engaged by the member arms, said shoulders being engaged by the arms to lock the jaw in its uppermost position.

PETER ERNFRID HURTHIG.

REFERENCES CITED

The following references are of record in the file of this patent:

UNITED STATES PATENTS

| Number  | Name    | Date          |
|---------|---------|---------------|
| 440,336 | Shaw    | Nov. 11, 1890 |
| 905,390 | Trumble | Dec. 1, 1908  |